Oct. 12, 1948.  R. W. LIDINGTON  2,451,440
PROTECTIVE GUARD FOR POWER TAKE OFF SHAFTS OF TRACTORS
Filed April 4, 1946

Inventor
ROBERT W. LIDINGTON
By W. S. McDowell
Attorney

Patented Oct. 12, 1948

2,451,440

UNITED STATES PATENT OFFICE 2,451,440

PROTECTIVE GUARD FOR POWER TAKE-OFF SHAFTS OF TRACTORS

Robert W. Lidington, Rochester, N. Y., assignor to The Ohio State University Research Foundation, Columbus, Ohio, a corporation of Ohio Application April 4, 1946, Serial No. 659,517

3 Claims. (Cl. 74—609)

My invention relates to safety guards for machinery, and more particularly to safety guards of the type used as a protective covering for the power take-off shafts of tractors.

At present, farm tractors in common use are supplied with exposed power take-off shafts which generally extend rearwardly out of the differential housing. Such types also embody a clutch actuating member to engage and disengage the shaft with its power source. This member usually comprises an externally accessible socket adapted to receive the triangular-shaped head of a crank arm or manually operated control lever, which upon oscillatory movement, serves to engage or disengage the power take-off shaft for rotation. The socket member is also arranged in the differential housing usually above and adjacent to the power take-off shaft. It will be understood that this arrangement of parts and members is common to many types of tractors now in general use in this country.

Exposed shafts and splines of this character necessarily present a serious hazard to operators of tractors, and accounts for numerous accidents and injuries each year.

It will be manifest that when an operator is engaging the shaft for rotation, by means of the socketed clutch-actuating member, his hands and clothing will be dangerously close to the rotating shaft, thus presenting a definite element of danger to the operator.

It is, therefore, the general object of my invention to provide a protective guard for the exposed power take-off shafts of tractors, wherein the guard element permanently carries a clutch actuating lever which extends externally of the guard, and whereby, when the protective guard is removed from its normal position, the actuating lever is also removed from its operating position, consequently rendering the clutch-actuating member inoperable.

It is another object of my invention to provide a protective guard and clutch-actuating mechanism for power take-off shafts of tractors, which utilizes standard parts, and which may be easily attached to the differential housing of a tractor.

For a further and more complete understanding of my invention, reference is made to the following description and accompanying drawings, wherein.

Figure 1:
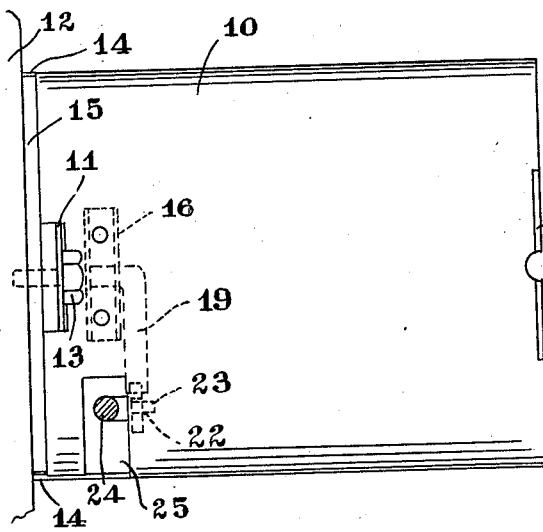
Fig. 1 is a top plan view of my improved protective guard in its normal or operating position upon the differential housing of a tractor.
Figure 2:
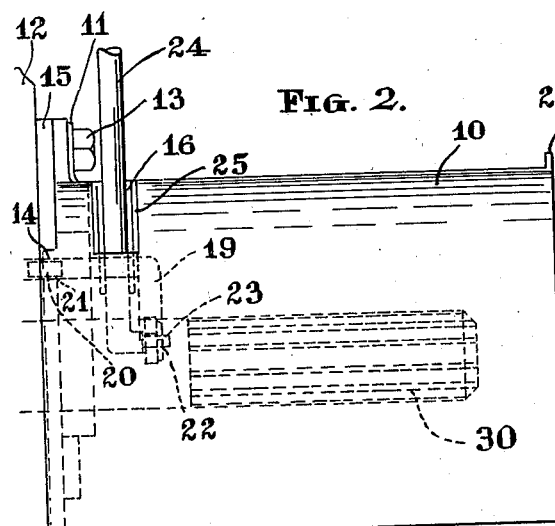
Fig. 2 is a side elevational view thereof.
Figure 3:
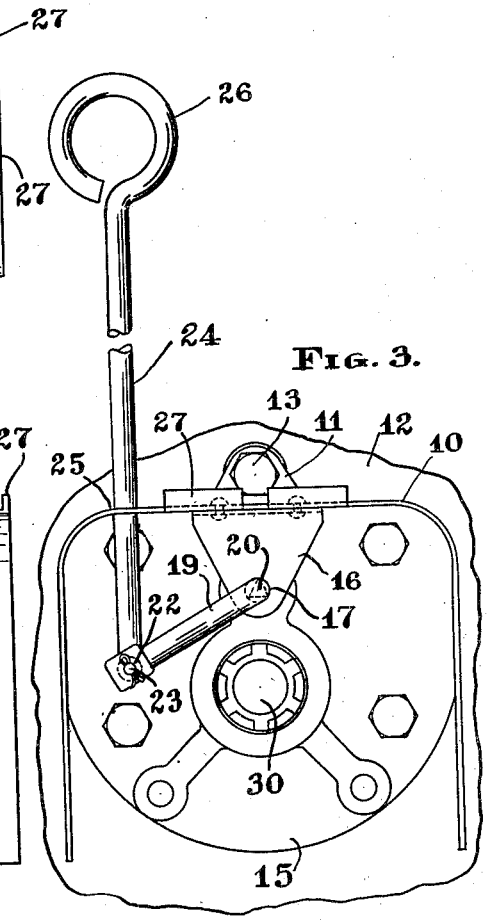
Fig. 3 is a rear end view of the combination guard and clutch actuating level assembled on the differential housing of a tractor.
Figure 4:
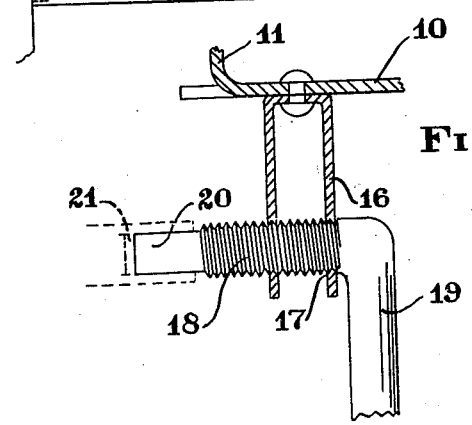
Fig. 4 is an enlarged sectional view disclosing the clutch actuating lever in operating engagement with the socket member in the differential housing of a tractor.

Referring now to the drawings, it will be seen that my improved protective guard and combination clutch-actuating device embodies a U-shaped shield member 10 formed with a vertically extending attaching flange 11 at its forward edge, the latter being recessed adjacent the flange 11 to allow the shield to fit flush against the differential housing 12 of a tractor. The flange 11 is provided with a circular aperture through which a differential housing bolt 13 is passed to secure the shield to the housing. The forward edge of the shield is also formed with horizontally projecting side flanges 14 which fit snugly against the outer edge of the differential housing plate 15 to further hold the shield against movement.

A supporting bracket 16 is riveted to the under side of the shield 10, and has downwardly projecting arms which serve to rotatably support, by means of threaded apertures 17, the threaded shank 18 of a crank arm 19. The threaded shank 18 terminates at its forward end in a triangular-shaped head 20 adapted for insertion within a like shaped clutch actuating socket 21 contained in the housing 12.

It will be manifest, that in standard tractor designs having power take-off shafts, the rotation of the socket member serves to disengage or engage a clutch mechanism, not shown in the drawings, to impart rotation to the splined power take-off shaft 30.

The opposite end of the crank arm 19 is relatively flat and is formed with an unthreaded aperture 22 which receives a horizontally extending pin 23 formed at the lower end of a vertically positioned operating lever 24. The pin 23 is held in connection with the crank arm by means of a cotter key, as shown at 28. The operating lever 24 extends vertically upward from the connection and through an open slot 25 formed in the upper side portion of the shield 10, and terminates in a circular handle 26 located exteriorly of the shield.

It will be seen, that by manually imparting a vertical motion to the lever 24 an oscillatory motion will be ultimately imparted to the clutch-actuating socket 21 to either engage or disengage the splined shaft 30 for rotation.

The upper portion of the rearward edge of the shield 10 is formed with a pair of upwardly bent connecting flanges 27 which serve as an attaching means for additional guard sections, not shown.

In view of the foregoing, it will be seen that my invention contemplates an efficient and useful safety device that may be easily and quickly attached to many types of tractors now in common use. It will also be noted that by combining the elements of a protective shield and a manually operated clutch-actuating device in the manner herein described, I have provided means whereby the operation of the power take-off clutch element of the tractor is impossible unless the shield is in its proper protective position upon the differential housing and around the exposed power take-off shafts.

My invention is characterized by its operational efficiency, economy of manufacture, ease of attachment and margin of safety.

I claim:

1. A protective guard attachment for tractors of the type provided with an exposed power take-off shaft and a socketed rotatable clutch-actuating element for engaging and disengaging said shaft for rotation, said attachment comprising an open-ended shield for detachable installation upon a tractor in longitudinally extending and spaced parallel order around its exposed power take-off shaft, said shield when so installed extending beyond the exposed end of the power take-off shaft and enclosing the socketed clutch-actuating member of the tractor, a crank lever integrally carried by said shield interiorly thereof and engageable with the clutch-actuating element of the tractor upon installation of the shield thereon, said lever being operable to rotate the clutch-actuating element of the tractor to control the rotation of the power take-off shaft, and a manually operable lever connected with said crank lever and extending exteriorly of said shield, whereby actuation of said crank lever and the clutch-actuating element of the tractor may be effected remotely of the power take-off shaft and exteriorly of said shield.

2. A protective guard attachment for tractors of the type provided with an exposed rotatable power take-off shaft and an exposed socketed clutch-actuating element disposed adjacent the shaft and operable to control the rotation thereof, said attachment comprising a U-shaped open-ended shield for detachable installation upon a tractor in longitudinally extending spaced parallel relation to the power take-off shaft thereof, said shield when so installed extending beyond the exposed end of the shaft and substantially enclosing the clutch-actuating element of the tractor, a crank lever integrally carried by said shield interiorly thereof and engageable with the clutch-actuating element of the tractor upon installation of the shield thereon, said lever being operable to move the clutch actuating element to control the rotation of the power take-off shaft of the tractor, and a manually operable lever connected with said crank lever interiorly of said shield and extending exteriorly thereof, whereby actuation of said crank arm and the clutch-actuating element of the tractor may be effected remotely of the power take-off shaft and exteriorly of said shield.

3. In a farm tractor having a differential casing, a driven power take-off shaft rotatably supported in said casing and having an end portion projecting exteriorly thereof, and a socketed actuating member arranged exteriorly of the casing adjacent the power take-off shaft and operable to control the rotation of the power take-off shaft; a protective guard for the power take-off shaft comprising a U-shaped shield detachably secured to the differential casing of the tractor and extending longitudinally of the power take-off shaft in spaced parallel relation thereto, said shield extending beyond the outer end of the shaft and substantially enclosing the socketed actuating member, a crank lever integrally carried by said shield interiorly thereof and having one of its ends in removable engagement with the socketed actuating member of the tractor, said crank lever when so engaged being operable to move the socketed actuating member of the tractor to control the rotation of the power take-off shaft, and a manually operable extension lever connected with said crank lever interiorly of said shield and extending exteriorly thereof, whereby actuation of said crank lever and the socketed actuating member of the tractor may be effected remotely of the power take-off shaft and exteriorly of said shield.

ROBERT W. LIDINGTON.

REFERENCES CITED

The following references are of record in the file of this patent:

UNITED STATES PATENTS

| Number | Name | Date |
|---|---|---|
| 1,566,924 | Robertson | Dec. 22, 1925 |
| 1,937,839 | Parret | Dec. 5, 1933 |
| 2,287,279 | Stumpf | June 23, 1942 |
| 2,317,957 | Frudden | Apr. 27, 1943 |